(12) United States Patent
Hong

(10) Patent No.: US 8,543,375 B2
(45) Date of Patent: Sep. 24, 2013

(54) MULTI-MODE INPUT METHOD EDITOR

(75) Inventor: Feng Hong, Foster City, CA (US)

(73) Assignee: Google Inc., Mountain View, CA (US)

( * ) Notice: Subject to any disclaimer, the term of this patent is extended or adjusted under 35 U.S.C. 154(b) by 278 days.

(21) Appl. No.: 12/595,211

(22) PCT Filed: Apr. 9, 2008

(86) PCT No.: PCT/US2008/059755
§ 371 (c)(1),
(2), (4) Date: Mar. 12, 2010

(87) PCT Pub. No.: WO2008/124769
PCT Pub. Date: Oct. 16, 2008

(65) Prior Publication Data
US 2010/0217581 A1 Aug. 26, 2010

Related U.S. Application Data

(60) Provisional application No. 60/911,078, filed on Apr. 10, 2007.

(30) Foreign Application Priority Data

Apr. 16, 2007 (CN) .......................... 2007 1 0101818

(51) Int. Cl.
G06F 17/28 (2006.01)
G06F 17/20 (2006.01)
G06F 17/27 (2006.01)
G10L 21/00 (2006.01)

(52) U.S. Cl.
USPC ................ 704/4; 704/2; 704/3; 704/5; 704/8; 704/9; 704/10; 704/270; 704/270.1; 704/275

(58) Field of Classification Search
USPC ................ 704/2, 3, 4, 5, 9, 8, 10, 270, 270.1, 704/275
See application file for complete search history.

(56) References Cited

U.S. PATENT DOCUMENTS

| 5,634,134 A | 5/1997 | Kumai et al. |
| 6,002,390 A * | 12/1999 | Masui .......................... 345/173 |
| 6,014,615 A * | 1/2000 | Chen ................................ 704/3 |
| 6,073,146 A * | 6/2000 | Chen ............................ 715/264 |
| 6,275,789 B1 * | 8/2001 | Moser et al. ...................... 704/7 |
| 6,438,515 B1 * | 8/2002 | Crawford et al. ................. 704/5 |
| 6,922,811 B1 | 7/2005 | Leung et al. |

(Continued)

FOREIGN PATENT DOCUMENTS

| CN | 1255669 A | 6/2000 |
| CN | 1464371 A | 12/2003 |

(Continued)

OTHER PUBLICATIONS

Chang, Jung-Hsing, 2001. "The syntax of event structure in Chinese", PhD Dissertation, University of Hawaii.*

(Continued)

*Primary Examiner* — Edgar Guerra-Erazo
(74) *Attorney, Agent, or Firm* — Remarck Law Group PLC

(57) ABSTRACT

Methods, systems, and apparatus, including computer program products, in which an input method editor receives composition inputs and determines language context values based on the composition inputs. Candidate selections based on the language context values and the composition inputs are identified.

19 Claims, 3 Drawing Sheets

(56) References Cited

U.S. PATENT DOCUMENTS

| | | | |
|---|---|---|---|
| 7,107,204 B1* | 9/2006 | Liu et al. | 704/2 |
| 7,403,888 B1* | 7/2008 | Wang et al. | 704/2 |
| 7,672,832 B2* | 3/2010 | Huang et al. | 704/9 |
| 7,752,032 B2* | 7/2010 | Izuha | 704/7 |
| 7,885,807 B2* | 2/2011 | Bagnato et al. | 704/4 |
| 7,983,895 B2* | 7/2011 | McEntee et al. | 704/2 |
| 8,073,683 B2* | 12/2011 | Alshawi et al. | 704/10 |
| 8,346,536 B2* | 1/2013 | Jiang et al. | 704/2 |
| 2003/0074353 A1* | 4/2003 | Berkan et al. | 707/5 |
| 2004/0078762 A1* | 4/2004 | Lee et al. | 715/536 |
| 2004/0254783 A1* | 12/2004 | Isahara | 704/9 |
| 2005/0060138 A1* | 3/2005 | Wang et al. | 704/1 |
| 2005/0216253 A1* | 9/2005 | Brockett | 704/5 |
| 2005/0222838 A1* | 10/2005 | Gong | 704/5 |
| 2006/0095843 A1 | 5/2006 | Chou | |
| 2006/0116866 A1* | 6/2006 | Suzuki et al. | 704/2 |
| 2007/0011132 A1* | 1/2007 | Zhou et al. | 707/1 |
| 2007/0094026 A1* | 4/2007 | Ativanichayaphong et al. | 704/257 |
| 2007/0265834 A1* | 11/2007 | Melnick | 704/10 |
| 2008/0052064 A1* | 2/2008 | Kim | 704/10 |
| 2009/0125497 A1* | 5/2009 | Jiang et al. | 707/4 |
| 2009/0240487 A1* | 9/2009 | Shen et al. | 704/9 |
| 2010/0286979 A1* | 11/2010 | Zangvil et al. | 704/9 |

FOREIGN PATENT DOCUMENTS

| | | |
|---|---|---|
| CN | 1707409 A | 12/2005 |
| JP | 10254868 A | 9/1998 |
| JP | 11096153 A | 4/1999 |
| JP | 11338858 A | 12/1999 |

OTHER PUBLICATIONS

Oard, D W, et al,; Effects of term segmentation on Chinese/English cross-language information retrieval: 6th International symposium on String Processing and information Retievat 5th International Workshop on Groupware; Sep. 22, 1999.*

Chinese Office Action dated Jun. 22, 2011 from CN Application No. 200710101818.2 (with English translation), 11 pages.

International Preliminary Report on Patentability from PCT Application No. PCT/US2008/059755, mailed Oct. 22, 2009, 7 pages.

International Search Report and Written Opinion from PCT Application No. PCT/US2008/059755, mailed Aug. 27, 2008, 11 pages.

Notification of Transmittal of the International Search Report and the Written Opinion of the International Searching Authority, or the Declaration for Application No. PCT/US2008/059755, dated Aug. 27, 2008, 11 pages.

* cited by examiner

MULTI-MODE INPUT METHOD EDITOR

This application claims the benefit of priority of U.S. Provisional Patent application No. 60/911,078, filed on Apr. 10, 2007 and China Application No. 200710101818.2, filed on Apr. 16, 2007, the entire disclosures of which are incorporated herein by reference.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters defined by base Pinyin characters and five tones. The mapping of these many-to-one associations can be implemented by input methods that facilitate entry of characters and symbols not found on input devices. Accordingly, a Western-style keyboard can be used to input Chinese characters. Likewise, input methods can be used for using a Western style keyboard to input many other languages that include ideograms, such as the Japanese language, the Korean language, and other languages.

An input method editor can be used to realize an input method. For example, an input method editor may have two language context modes, e.g., an English mode and a Chinese mode. Often a user of a device implementing an input method editor may desire to switch between the language context modes, e.g., from Chinese to English or from English to Chinese. A user selection of a particular language context mode may be required, which can, at times, be inconvenient.

SUMMARY

This specification describes technologies related to client input method editors. In an implementation, an input method editor receives composition inputs and determines language context values based on the composition inputs. Candidate selections for presentation to a user are identified based on the language context values.

In another implementation, an input method editor receives composition inputs and determines candidate selections for two or more different languages based on the composition inputs. The candidate selections for the two or more different languages are evaluated against language models for the two or more different languages. A language context value is determined for each of the two or more different languages based on the evaluation, and candidate selections for presentation are identified based on the language context values.

In another implementation, a system includes a data store and an input method editor engine. The data store is configured to store input method editor language models. Each language model includes a rule set for a language, and the language models collectively include rule sets for two or more different languages. The input method editor engine is configured to receive composition inputs and determine candidate selections for the two or more different languages based on the received composition inputs. The candidate selections can be evaluated against the language models to determine language context values for each of the two or more different languages, and candidate selections for presentation can be identified based on the language context values.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
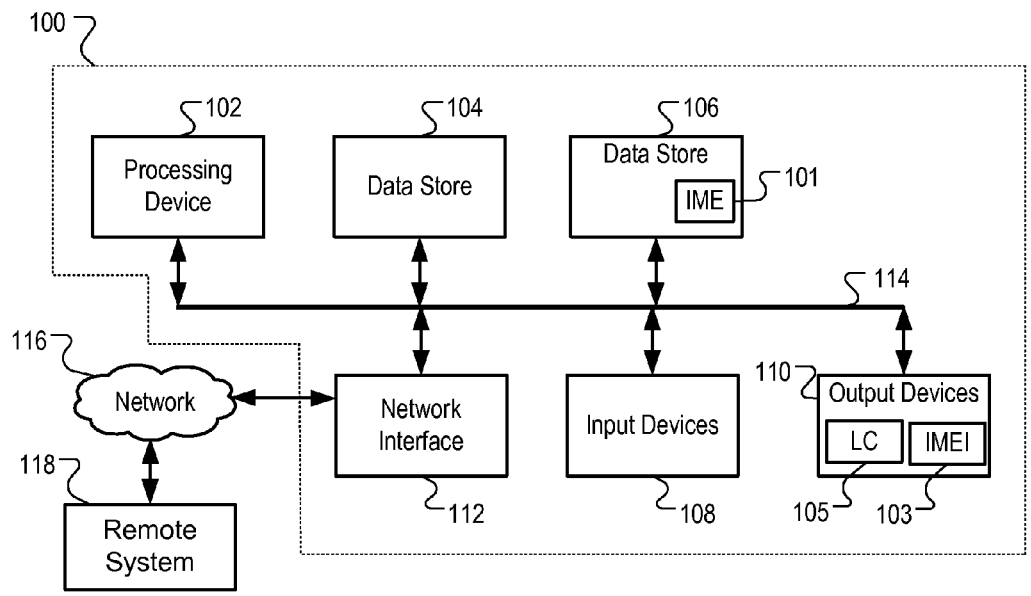
FIG. 1 is a block diagram of an example system that can be utilized to implement the systems and methods described herein.

FIG. 1 is a block diagram of an example device 100 that can be utilized to implement the systems and methods described herein. The example device 100 can, for example, be a computer device, such as a personal computer device, or other electronic devices, such as a mobile phone, mobile communication device, personal digital assistant (PDA), and the like.

The example device 100 includes a processing device 102, a first data store 104, a second data store 106, input devices 108, output devices 110, and a network interface 112. A bus system 114, including, for example, a data bus and a motherboard, can be used to establish and control data communication between the components 102, 104, 106, 108, 110 and 112. Other system architectures can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

Example input devices 108 can include a keyboard, a mouse, a stylus, etc., and example output devices 110 can include a display device, an audio device, etc. The network interface 112 can, for example, include a wired or wireless network device operable to communicate data to and from a network 116. The network 116 can include one or more local area networks (LANs) and/or a wide area network (WAN), such as the Internet.

In some implementations, the device 100 can include input method editor (IME) code 101 from a data store, such as the data store 106. The input method editor code 101 can include instructions that upon execution cause the processing device 102 to carry out input method editing functions. The input method editor code 101 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc.

Execution of the input method editor code 101 generates or launches an input method editor instance 103. The input method editor instance 103 facilitates the processing of one or more input methods at the device 100, during which time the device 100 can receive composition inputs for input characters or symbols, such as, for example, Hanzi characters. For example, the user can use one or more of the input devices 108 (e.g., a keyboard, such as a Western-style keyboard, a stylus used with a handwriting recognition engine, etc.) to input composition inputs for identification of Hanzi characters. In some examples, a Hanzi character can be composed of more than one composition input.

The first data store 104 and/or the second data store 106 can store an association of composition inputs and characters. Based on a user input, the input method editor instance 103 can use information in the data store 104 and/or the data store 106 to identify one or more candidate selections represented by the input. In some implementations, if more than one candidate selection is identified, the candidate selections are displayed on an output device 110. Using the input device 108, the user can select from the candidate selections a Hanzi character that the user desires to input.

In some implementations, the input method editor instance 103 on the device 100 can receive one or more Pinyin composition inputs and convert the composition inputs into Hanzi characters. The input method editor instance 103 can, for example, use compositions of Pinyin syllables or characters received from keystrokes to represent the Hanzi characters. Each Pinyin syllable can, for example, correspond to one or more keystrokes in the Western-style keyboard. Using a Pinyin input method editor, a user can input a Hanzi character by using composition inputs that includes one or more Pinyin syllables representing the sound of the Hanzi character. Input methods for other languages, however, can also be facilitated.

In some implementations, a remote computing system 118 having access to the system 100 can also be used to edit a logographic script. For example, the system 100 may be a server that provides logographic script editing capability via the network 116. In one example, a user can edit a logographic script stored in the data store 104 and/or the data store 106 using a remote computing system, e.g., a client computer. The system 100 can, for example, select a character and receive a composition input from a user over the network interface 112. The processing device 102 can, for example, identify one or more characters adjacent to the selected character, and identify one or more candidate selections based on the received composition input and the adjacent characters. The system 100 can transmit a data communication that includes the candidate selections back to the remote computing system.

In some implementations, the input method editor instance 103 can identify candidate selections based on one or more composition inputs and language contexts 105. The language contexts 105 can, for example, define different languages supported by the input method editor instance 103, e.g., an English language context 105a, a Chinese language context 105b, a Korean language context 105c, etc. For example, the input method editor instance 103 can apply the English language context 105a to composition inputs to map the composition inputs to the English alphabet. Likewise, the input method editor instance 103 can apply the Chinese language context 105b to composition inputs to map the composition inputs to Pinyin inputs, etc.

Based on the composition inputs and the language contexts 105, the input method editor instance 103 can identify one or more candidate selections for selection by the user. In some implementations, the language contexts 105 can be utilized to automatically provide candidate selections defined by different languages, e.g., an interleaved display mode in which candidate selections from the English language, e.g., letters defining a word, can be displayed simultaneously with Chinese characters, e.g., Hanzi characters. In some implementations, the language contexts 105 can be utilized to automatically provide candidate selections defined by a one language, e.g., a toggled display mode in which candidate selections from only the English language, e.g., letters defining words, may be displayed for a first set of characters, and candidate selections from the Chinese language, e.g., Hanzi characters, may only be displayed for a second set of characters.

Figure 2:
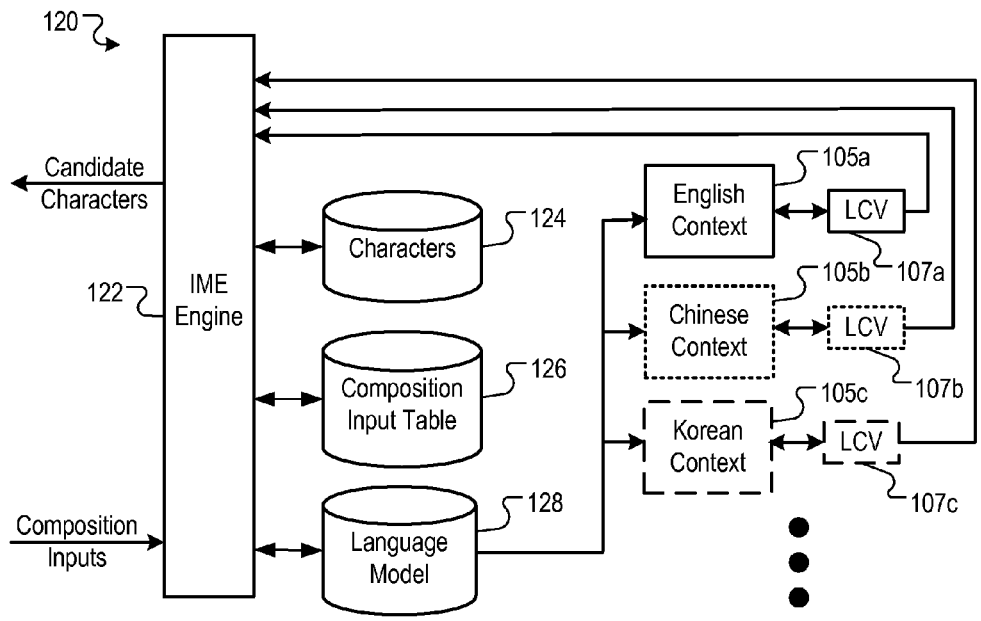
FIG. 2 is a block diagram of an example input method editor.

FIG. 2 is a block diagram of an example input method editor system 120. The input method editor system 120 can, for example, be implemented using the input method editor code 101 and associated data stores 104 and 106. The input method editor system 120 includes an input method editor engine 122, a character data store 124, a composition input data store 126, and a language model data store 128. Other storage architectures can also be used. The character data store 124 includes characters of a logographic script used in one or more language models, and characters and words in Roman-based or western-style alphabets, e.g., English, German, Spanish, etc. In some implementations, the character data store 124 also includes information about relationships between characters. For example, the character data store 124 can include scores or probability values assigned to a character depending on characters adjacent to the character. Other contextual relation data can also be used.

The composition input data store 126 includes an association of composition inputs and the characters stored in the character data store 124. In some implementations, the composition input data store 126 can link each of the characters in the character data store 124 to a composition input used by the input method editor engine 122. For example, the input method editor engine 122 can use the information in the character data store 124 and the composition input data store 124 to associate and/or identify one or more characters in the character data store 124 with one or more composition inputs in the composition input data store 126.

The language model data store 128 can define one or more language models, e.g., an English language model, a Chinese language model, etc. Each language model can, for example, define a particular rule set, e.g., grammar particular to a language, phrase sets, verbals, etc., that can be used to determine a user's likely intent in entering a set of composition inputs. Each language model can also include a user history of a particular user, e.g., a dictionary of words and phrased often used by a particular user.

In some implementations, the input method editor engine 122 can interpret the composition inputs according to a language context 105, e.g., an English context 105a, a Chinese context 105b, a Korean context 105c, etc. When the composition inputs are interpreted according to a language context 105, a language context value 107 can be determined. Based on the language context value 107 and the composition inputs, candidate selections can be identified and presented to a user for selection.

For example, several composition inputs, e.g., keystrokes, can be received by the input method editor engine 122. The keystrokes may define a series of Pinyin inputs in the Chinese context 105b, and may define a series of letters in the English context 105a. Accordingly, one or more English candidate selections, e.g., words, and one or more Chinese candidate selections, e.g., Hanzi characters, can be presented to the user for selection.

In some implementations, the English context value 107*a* can be determined by comparing the composition inputs to prefixes of English words and setting the English context value based on the comparison. For example, the composition inputs o-p-p-o match the character strings in the word "opportunity." The English context value 107*a* can, for example, be set in proportion to the prefix match identified by the comparison, e.g., the context value may be low for the composition inputs o-p, but may be much higher for the composition inputs o-p-p-o-r-t-u.

Language context values 107 can also be determined by other processes. For example, the Chinese context value 107*b* can be determined by evaluating the Chinese characters against a Chinese language model and setting the Chinese context value 107*b* based on the evaluation. For example, a Chinese language model can include a Chinese grammar model. Example Chinese grammar models can include serial verb construction models, perfectives and imperfectives models, and other grammar models.

Based on composition inputs, e.g., keystrokes, a series of Pinyin inputs can be identified. The Pinyin composition inputs, in turn, can be utilized to identify Hanzi characters. The Chinese grammar model can be applied to the Hanzi characters to determine the likelihood of the user intending to input in the Chinese context. For example, a composition input string that results in Hanzi characters that are all verbs would be scored very low, but a composition input string that results that result with a verb and an object would be scored higher, etc. By way of another example, a composition input that results in the Chinese character string that reads "I love flowers" would receive a higher Chinese context value 107*b*, and composition input string that results in the Chinese character string that reads "bed cow tv" would receive a very low Chinese context value 107*b*.

Other processes can be used to determine language context values 107. For example, the context value of an infrequently used word of a particular language may be scaled lower, while the context value of an often used word or phrase as defined by a user profile may be scaled higher, etc.

In some implementations, the order and selection of the candidate selections can be determined based on language context value 107 and the composition inputs. For example, for a given composition input, two candidate selections having language context values of 0.7 and 0.5 for a first language may be identified, and a candidate selection having a corresponding language context value of 0.6 may be identified for a second language. Accordingly, the characters may be presented in the order of the language context values, e.g., the character having the context value of 0.7 would be ranked first; the character having the context value of 0.6 would be ranked second; and the character having the context value of 0.5 would be ranked third.

In some implementations, the language context values can be normalized, e.g., the highest language context value can be normalized to 1.0. In some implementations, language context values 107 can be determined for each candidate character, e.g., each character may have an associated language context value, and thus the likelihood that a user intended to type a particular character can be estimated. In some implementations, language context values 107 can be determined for a composition input string, e.g., the string may have associated language context values 107 that indicate the likelihood that the composition input string was intended to apply to particular languages.

Figure 3:
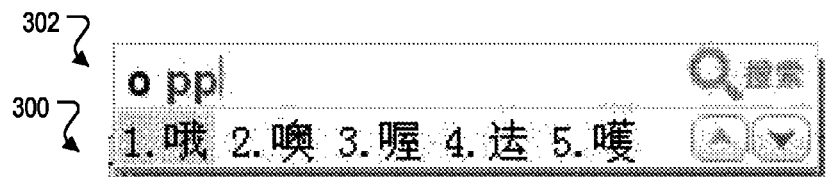
FIG. 3 is an example set of candidate selections based on first composition inputs.

FIG. 3 is an example set of candidate selections 300 based on first composition inputs 302 and language context values. The composition inputs o-p-p are, for example, received by an input method editor, e.g., the input method editor instance 103, and are interpreted according to a Chinese context 105*b* and an English context 105*a*. The candidate selections 1-5 can, for example, define Chinese characters having the highest language context values, and thus are displayed as shown.

Alternatively, the composition inputs o-p-p may have an English language context value that is lower than a Chinese language context value, and thus English candidate selections are not shown.

Figure 4:
FIG. 4 is another example set of candidate selections based on second composition inputs.

FIG. 4 is another example set of candidate selections 400 based on second composition inputs 402. The composition inputs o-p-p-o are, for example, received by an input method editor, e.g., the input method editor instance 103, and are interpreted according to a Chinese context 105*b* and an English context 105*a*. The candidate selection 1, however, defines the English word "opportunity" and has the highest language context value, and the Chinese selections 2-5 can define characters having the next highest language context values, and thus are displayed as shown.

Alternatively, the composition inputs o-p-p-o may have an English language context value that is higher than a Chinese language context value, and thus an English candidate selection is shown first.

Accordingly, the underlying language context values determined as described in reference to FIG. 3 thus indicate that the user most likely intended to input Chinese characters. However, the underlying language context values determined as described in reference to FIG. 4 indicate that the user most likely intended to input the English word "opportunity."

Figure 5:
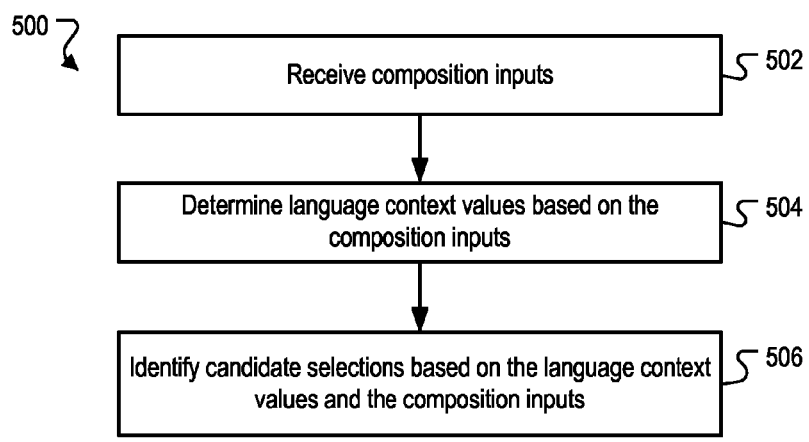
FIG. 5 is a flow diagram of an example input method process.

FIG. 5 is a flow diagram of an example input method process 500. The process 500 can, for example, be implemented in the device 100 of FIG. 1 and/or in the input method editor system 120 of FIG. 2.

The process 500 receives composition inputs (502). For example, the device 100 of FIG. 1 implementing an input method editor, and/or the input method editor system 120 of FIG. 2 can receive keyboard inputs from a keyboard. The keyboard inputs can be mapped to corresponding inputs according to a language context, e.g., alphanumeric inputs for an English context; Pinyin inputs for a Chinese context, etc.

The process 500 determines language context values based on the composition inputs (504). For example, the device 100 of FIG. 1 implementing an input method editor and/or the input method editor system 120 of FIG. 2 can determine language context values based on prefix matching, grammar rules, user history stored in a profile, etc.

The process 500 identifies candidate selections based on the language context values and the composition inputs (506). For example, the device 100 of FIG. 1 implementing an input method editor and/or the input method editor system 120 of FIG. 2 can identify candidate selections based on different language contexts applied to the composition inputs, and rank the candidate selections, at least in part, based on the language context values.

Figure 6:
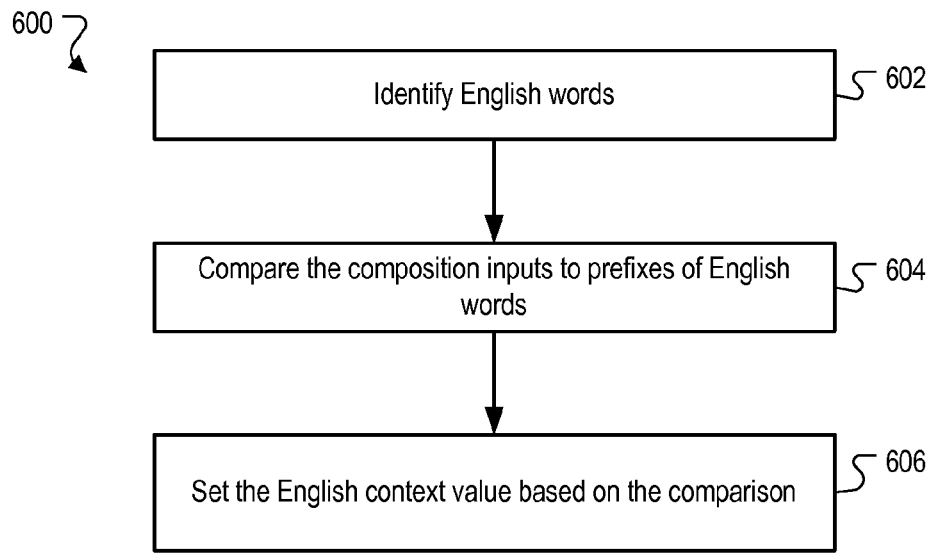
FIG. 6 is a flow diagram of an example context value process.

FIG. 6 is a flow diagram of an example context value process 600. The process 600 can, for example, be implemented in the device 100 of FIG. 1 and/or in the input method editor system 120 of FIG. 2.

The process 600 identifies English words (602). For example, the device 100 of FIG. 1 implementing an input method editor and/or the input method editor system 120 of FIG. 2 can identify a data store defining English words, e.g., a characters data store 124.

The process 600 compares the composition inputs to prefixes of the English words (604). For example, the device 100 of FIG. 1 implementing an input method editor and/or the input method editor system 120 of FIG. 2 can compare the composition inputs applied in the English context to the words in the character data store to identify words having matching prefixes.

The process 600 sets the English context value based on the comparison (606). For example, the device 100 of FIG. 1 implementing an input method editor and/or the input method editor system 120 of FIG. 2 can increase the English context value for each matching letter in a word prefix, e.g., the composition input defining the letter "o" may result in an English context value of 0, while the composition inputs defining the letters "o-p-p-o-r-t" may result in an English context value of 0.9.

Figure 7:
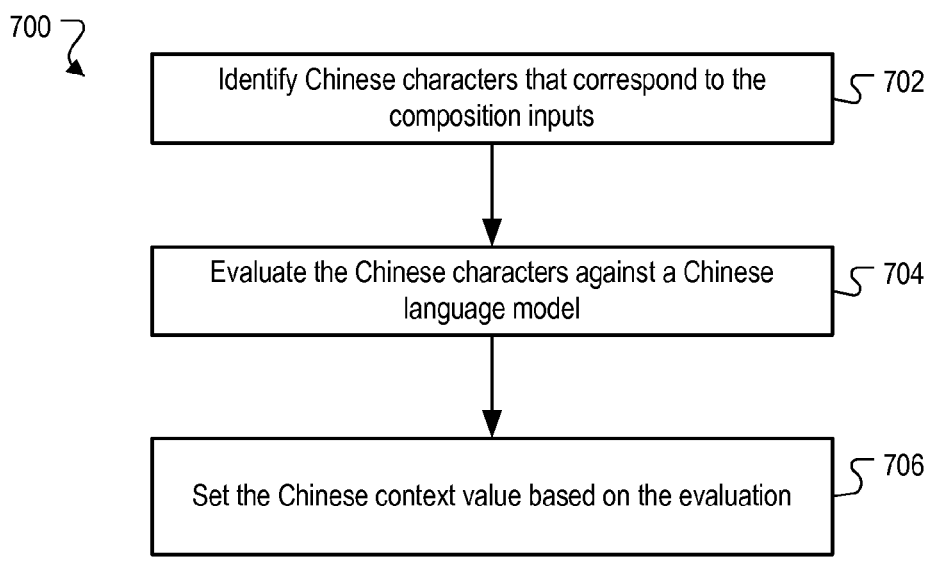
FIG. 7 is a flow diagram of another example context value process.

FIG. 7 is a flow diagram of another example context value process 700. The process 700 can, for example, be implemented in the device 100 of FIG. 1 and/or in the input method editor system 120 of FIG. 2.

The process 700 identifies Chinese characters that correspond to the composition inputs (702). For example, the device 100 of FIG. 1 implementing an input method editor and/or the input method editor system 120 of FIG. 2 can identify Hanzi characters for composition inputs defining Pinyin inputs in a Chinese context.

The process 700 evaluates the Chinese characters against a Chinese language model (704). For example, the device 100 of FIG. 1 implementing an input method editor and/or the input method editor system 120 of FIG. 2 can evaluate the Hanzi character against a Chinese grammar model, such as a serial verb construction model; a perfectives and imperfectives mode; and/or other grammar models. Other language models can also be used.

The process 700 sets the Chinese context value based on the evaluation (706). For example, the device 100 of FIG. 1 implementing an input method editor and/or the input method editor system 120 of FIG. 2 can set a Chinese context value to a relatively high value for a series of Hanzi characters that satisfy one or more Chinese grammar models, and can set a Chinese context value to a relatively low value for a series of Hanzi characters that do not satisfy a Chinese grammar model.

Although described in the context of particular language and input method examples, the systems and methods described herein can be used for any language that utilizes a logographic script. For example, the systems and methods described herein can be used for many other languages that include ideograms, such as the Japanese language, the Korean language, and other languages.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a computing device having one or more processors, composition inputs;
   determining, at the computing device, candidate selections for two or more different languages based on the composition inputs;
   evaluating, at the computing device, the candidate selections for the two or more different languages against language models for the two or more different languages, wherein each language model includes a rule set for a language, and wherein the language models collectively include rule sets for the two or more different languages;
   determining, at the computing device, a language context value for each of the two or more different languages based on the evaluation;
   identifying, at the computing device, candidate selections for presentation based on the language context values, the candidate selections including at least one candidate selection in each of the two or more languages; and
   providing for display, at the computing device, the candidate selections in a single, interleaved list of candidate selections,
   wherein the single, interleaved list of candidate selections (i) includes at least one candidate selection in each of the two or more languages and (ii) identifies a rank for each of the candidate selections, each rank being indicative of a relative likelihood that its corresponding candidate selection was intended from the composition inputs.

2. The method of claim 1, wherein determining a language context value for each of the two or more different languages comprises:
   determining an English language context value; and
   determining a Chinese language context value.

3. The method of claim 2, wherein:
   determining an English language context value comprises:
     applying the composition inputs in an English context;
     comparing the composition inputs to prefixes of English words; and
     setting the English context value based on the comparing; and
   determining a Chinese language context value comprises:
     applying the composition inputs in a Chinese context;
     identifying Chinese characters that correspond to the composition inputs;
     evaluating the Chinese characters against a Chinese language model; and
     setting the Chinese context value based on the evaluation.

4. The method of claim 3, wherein the language models include a Chinese language model that includes a grammar rule set for the Chinese language.

5. The method of claim 4, wherein the Chinese language model is based one or more of serial verb construction or aspects of perfectives and imperfectives.

6. The method of claim 1, further comprising:
   receiving, at the computing device, additional composition inputs after receiving the composition inputs;
   determining, at the computing device, modified candidate selections for the two or more different languages based on the composition inputs and the additional composition inputs;
   evaluating, at the computing device, the modified candidate selections for the two or more different languages against language models for the two or more different languages;

determining, at the computing device, a modified language context value for each of the two or more different languages based on the evaluation;

identifying, at the computing device, modified candidate selections for presentation based on the language context values, the modified candidate selections including at least one of the modified candidate selections in each of the two or more languages; and providing for display, at the computing device, the modified candidate selections in a single, interleaved list of the modified candidate selections.

7. The method of claim 6, wherein the single, interleaved list of the modified candidate selections (i) is different than the single, interleaved list of the candidate selections, (ii) includes at least one of the modified candidate selections in each of the two or more of the plurality of languages, and (iii) identifies a rank for each of the modified candidate selections, and each rank being indicative of a relative likelihood that its corresponding modified candidate selection was intended from the composition inputs and the additional composition inputs.

8. A computer-implemented method, comprising:

receiving, at a computing device having one or more processors, composition inputs;

determining, at the computing device, a set of candidate selections based on the composition inputs, each candidate selection of the set of candidate selections corresponding to a representation of the composition inputs in one language of a plurality of languages;

determining, at the computing device, a first language context value for each candidate selection, each candidate selection being associated with a specific language of the plurality of languages, each first language context value indicating a likelihood that its associated candidate selection corresponds to the composition inputs when compared against other candidate selections in the specific language;

determining, at the computing device, a second language context value for each of the plurality of languages based on the composition inputs, each second language context value indicating a likelihood that the composition inputs correspond to its associated language of the plurality of languages; and providing for display, from the computing device, a list of candidate selections based on at least one of: (i) the first language context values, and (ii) the second language context values, the list of candidate selections including at least one candidate selection in each of two or more of the plurality of languages, wherein the list of candidate selections is a single, interleaved list of candidate selections that (i) includes at least one candidate selection in each of the two or more of the plurality of languages and (ii) identifies a rank for each of the candidate selections, each rank being indicative of a relative likelihood that its corresponding candidate selection was intended from the composition inputs.

9. The method of claim 8, wherein the providing for display includes determining a ranking of the set of candidate selections and utilizing the ranking to order the list of candidate selections, wherein determining the ranking is based on the first language context values.

10. The method of claim 8, further comprising determining a most likely language of the composition inputs based on the second language context values, wherein the list of candidate selections displayed include only those candidate selections in the most likely language.

11. The method of claim 8, wherein determining the first language context value for each one candidate selection of the set of candidate selections comprises evaluating the one candidate selection against a language model for its associated specific language.

12. The method of claim 8, further comprising:

receiving, at the computing device, additional composition inputs after receiving the composition inputs;

determining, at the computing device, a modified set of candidate selections based on the composition inputs and the additional composition inputs, each candidate selection of the modified set of candidate selections corresponding to a representation of the composition inputs and the additional composition inputs in one language of a plurality of languages;

determining, at the computing device, a first modified language context value for each candidate selection of the modified set of candidate selections, each candidate selection of the modified set of candidate selections being associated with a specific language of the plurality of languages, each first modified language context value indicating a likelihood that its associated candidate selection corresponds to the composition inputs and the additional composition inputs when compared against other candidate selections in the specific language;

determining, at the computing device, a second modified language context value for each of the plurality of languages based on the composition inputs and the additional composition inputs, each second modified language context value indicating a likelihood that the composition inputs and the additional composition inputs correspond to its associated language of the plurality of languages; and providing for display, from the computing device, a single, interleaved list of modified candidate selections based on at least one of: (i) the first modified language context values, and (ii) the second modified language context values.

13. The method of claim 12, wherein the single, interleaved list of the modified candidate selections (i) is different than the single, interleaved list of the candidate selections, (ii) includes at least one candidate selection in each of two or more of the plurality of languages from the modified set of candidate selections, and (iii) identifies a rank for each candidate selection of the modified set of candidate selections, each rank being indicative of a relative likelihood that its corresponding modified candidate selection was intended from the composition inputs and the additional composition inputs.

14. A computing device having one or more processors and configured to execute operations comprising:

receiving composition inputs;

determining a set of candidate selections based on the composition inputs, each candidate selection of the set of candidate selections corresponding to a representation of the composition inputs in one language of a plurality of languages;

determining a first language context value for each candidate selection, each candidate selection being associated with a specific language of the plurality of languages, each first language context value indicating a likelihood that its associated candidate selection corresponds to the composition inputs when compared against other candidate selections in the specific language;

determining a second language context value for each of the plurality of languages based on the composition inputs, each second language context value indicating a likelihood that the composition inputs correspond to its associated language of the plurality of languages; and providing for display a list of candidate selections based on at least one of: (i) the first language context values, and (ii) the second language context values, the list of candidate selections including at least one candidate selection in each of two or more of the plurality of languages, wherein the list of candidate selections is a single, interleaved list of candidate selections that (i) includes at least one candidate selection in each of the two or more of the plurality of languages and (ii) identifies a rank for each of the candidate selections, each rank being indicative of a relative likelihood that its corresponding candidate selection was intended from the composition inputs.

15. The computing device of claim 14, wherein the providing for display includes determining a ranking of the set of candidate selections and utilizing the ranking to order the list of candidate selections, wherein determining the ranking is based on the first language context values.

16. The computing device of claim 14, wherein the computing device is configured to perform determining a most likely language of the composition inputs based on the second language context values, wherein the list of candidate selections displayed include only those candidate selections in the most likely language.

17. The computing device of claim 14, wherein determining the first language context value for each one candidate selection of the set of candidate selections comprises evaluating the one candidate selection against a language model for its associated specific language.

18. The computing device of claim 14, wherein the operations further comprise:

receiving additional composition inputs after receiving the composition inputs;

determining a modified set of candidate selections based on the composition inputs and the additional composition inputs, each candidate selection of the modified set of candidate selections corresponding to a representation of the composition inputs and the additional composition inputs in one language of a plurality of languages;

determining a first modified language context value for each candidate selection of the modified set of candidate selections, each candidate selection of the modified set of candidate selections being associated with a specific language of the plurality of languages, each first modified language context value indicating a likelihood that its associated candidate selection corresponds to the composition inputs and the additional composition inputs when compared against other candidate selections in the specific language;

determining a second modified language context value for each of the plurality of languages based on the composition inputs and the additional composition inputs, each second modified language context value indicating a likelihood that the composition inputs and the additional composition inputs correspond to its associated language of the plurality of languages; and providing for display a single, interleaved list of modified candidate selections based on at least one of: (i) the first language context values, and (ii) the second language context values.

19. The computing device of claim 18, wherein the single, interleaved list of the modified candidate selections (i) is different than the single, interleaved list of the candidate selections, (ii) includes at least one candidate selection in each of two or more of the plurality of languages from the modified set of candidate selections, and (iii) identifies a rank for each candidate selection of the modified set of candidate selections, each rank being indicative of a relative likelihood that its corresponding modified candidate selection was intended from the composition inputs and the additional composition inputs.

* * * * *